United States Patent
Lembke

[19]

[11] Patent Number: 6,118,199
[45] Date of Patent: Sep. 12, 2000

[54] MAGNETIC BEARINGS

[75] Inventor: Torbjörn Lembke, Uppsala, Sweden

[73] Assignee: Magnetal AB, Uppsala, Sweden

[21] Appl. No.: 09/013,602

[22] Filed: Jan. 26, 1998

[30] Foreign Application Priority Data

Jan. 28, 1997 [SE] Sweden ................... 9700255

[51] Int. Cl.$^7$ .................................................. H02K 7/09
[52] U.S. Cl. ........................................................ 310/90.5
[58] Field of Search ................................. 310/90.5, 156

[56] References Cited

U.S. PATENT DOCUMENTS

| | | | |
|---|---|---|---|
| 611,809 | 10/1898 | Evershed | 310/90.5 |
| 3,611,815 | 10/1971 | Fischell | 310/90.5 |
| 3,650,581 | 3/1972 | Boden et al. | 310/90.5 |
| 3,779,618 | 12/1973 | Soglia et al. | 310/90.5 |
| 3,811,740 | 5/1974 | Sacerdoti et al. | 310/90.5 |
| 3,885,504 | 5/1975 | Baermann | 310/90.5 |
| 3,903,809 | 9/1975 | Miericke et al. | 104/148 SS |
| 3,937,148 | 2/1976 | Simpson | 310/90.5 |
| 3,951,075 | 4/1976 | Miericke et al. | 104/148 SS |
| 3,955,858 | 5/1976 | Poubeau | 310/90.5 |
| 4,700,094 | 10/1987 | Downer et al. | 310/90.5 |
| 4,761,579 | 8/1988 | Delassus | 310/90.5 |
| 5,396,136 | 3/1995 | Pelrine | 310/90.5 |
| 5,469,006 | 11/1995 | Pinkerton | 310/90.5 |
| 5,495,221 | 2/1996 | Post | 310/90.5 |
| 5,710,469 | 1/1998 | Ries | 310/90.5 |
| 5,783,885 | 7/1998 | Post | 310/90.5 |

FOREIGN PATENT DOCUMENTS

| 58-109719 | 6/1983 | Japan . |
|---|---|---|
| 9203090-7 | 4/1994 | Sweden . |

OTHER PUBLICATIONS

"Magnetic Suspension and Propulsion Systems for High–Speed Transportation", P.L. Richards and M. Tinkham, J. Appl. Phys. vol. 43, No. 6, Jun. 1972, pp. 2680–2690.

*Primary Examiner*—Clayton LaBalle
*Attorney, Agent, or Firm*—Young & Thompson

[57] ABSTRACT

Device for magnetic suspension of a rotor (10, 20, 30) in relative rotational movement along a predetermined rotation symmetric path with respect to a stator (14, 24, 26, 34, 36). Rotor (10, 20, 30) comprises a rotational body (11, 21, 31) which essentially consists of an electrically conductive unmagnetic material. Fitted at the stator (14, 24, 26, 34, 36) is at least one magnetic member (12, 22, 25, 32, 35), which comprises at least one rotation symmetric magnet (12, 22, 25, 32, 35) concentric with the rotational axis. The magnetic member is disposed to give rise to a rotation symmetric magnetic field concentric with the rotational axis. When and only when the rotational body (11, 21, 31) tends to leave the predetermined path and rotate eccentric, the magnetic field generates induced eddy currents in the rotational body (11, 21, 31), the eddy currents gives rise to restoring stabilising forces.

9 Claims, 5 Drawing Sheets

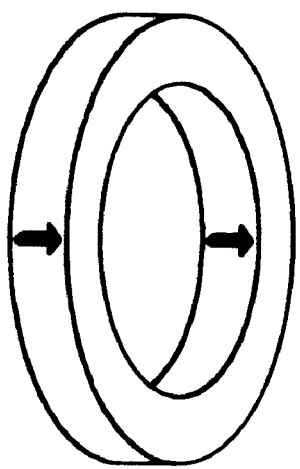
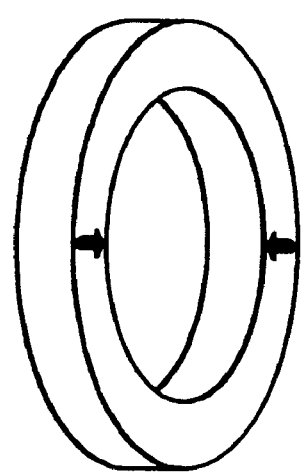
Fig. 3a  Fig. 3b
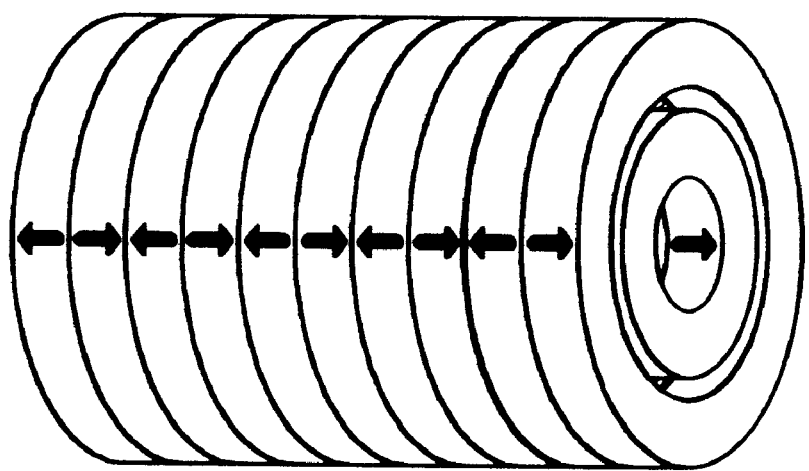
Fig. 4

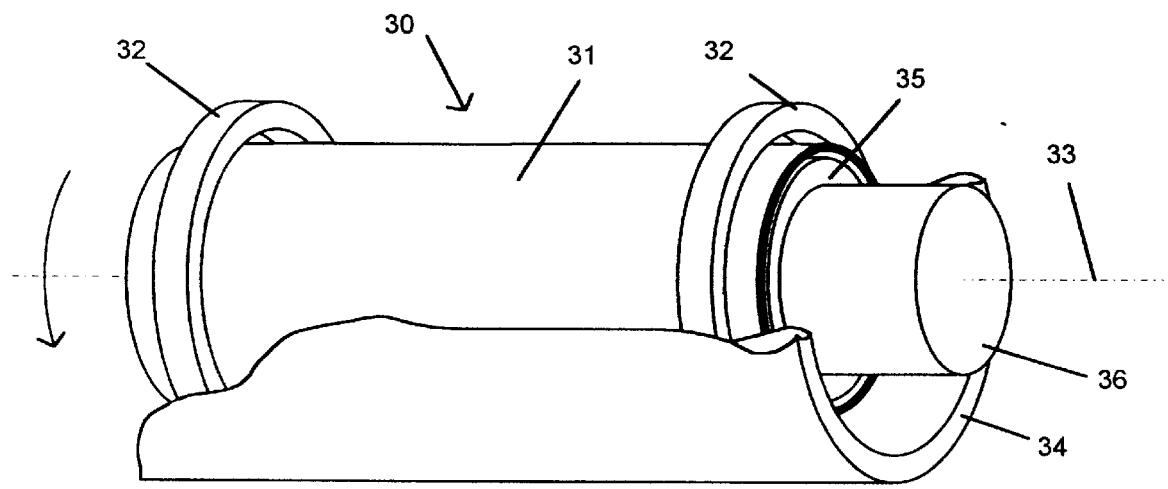
Fig. 5
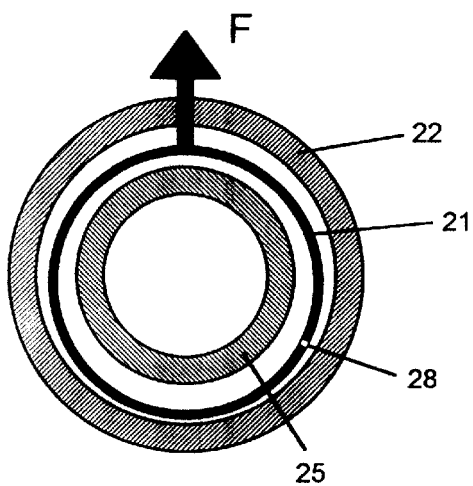
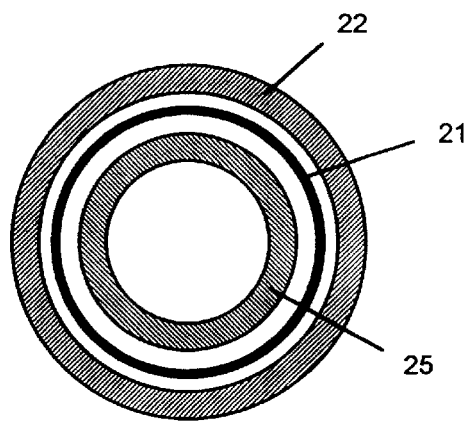
Fig. 6   Fig. 7

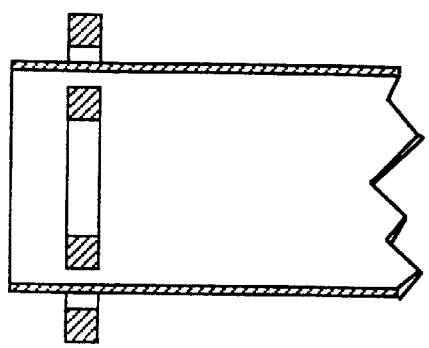
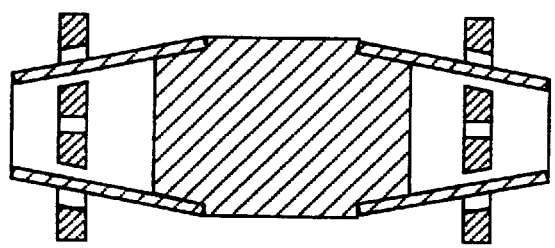
Fig. 8a  Fig. 8b
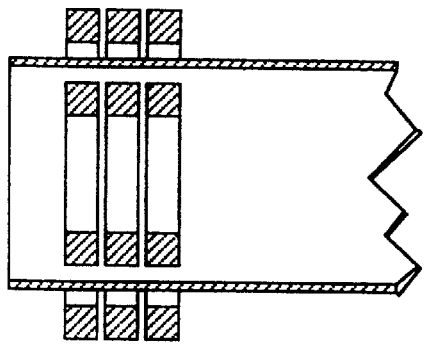
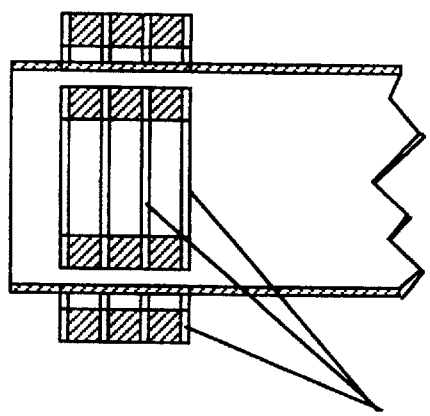
49
Fig. 8c  Fig. 8d
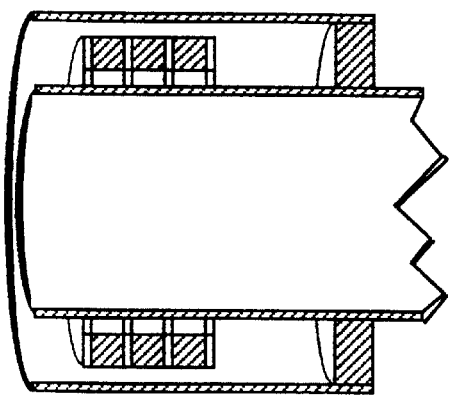
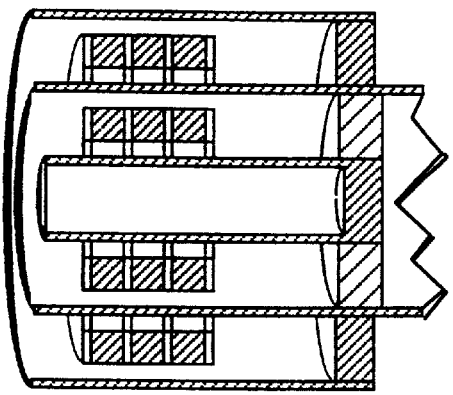
Fig. 8e  Fig. 8f

MAGNETIC BEARINGS

TECHNICAL FIELD

The invention relates generally to a device for contact free suspension of units in relative rotation and in particular to a device for magnetic suspension.

PRIOR ART

In many connections, in particular where high speeds are required, roller and slide bearings have limitations. These disadvantages mainly consist of wear, lubrication and vibrations. Therefore, magnetic bearings of different kinds have more and more started to replace conventional bearings in these connections. Mainly, so called active magnetic bearings, i.e. electronically regulated bearings, are used. One example of such active magnetic bearing is found in JP, A, 58-109719, where an additional annular bias magnet generates a bias magnetic field to linearise the attractive forces between the magnetic rotor and the electromagnets.

Occasionally, so called passive bearings, where the force usually is constituted by repulsion between oppositely directed magnets, are used. The latter may not, due to the "Earnshaws theorem", be made totally stable, but are often used together with a stabilising ball bearing, which then reduces their field of application. The advantages with these systems are the lack of regulating systems and a low price.

The idea of using permanent magnets for a totally stable suspension, without need of either regulating system or ball bearings, can be realised by letting the magnets induce stabilising eddy currents in an electrically conducting material at the rotor. According to Lenz' law, such currents are always directed so as to give an oppositely directed, and thus repellent and stabilising, magnetic field.

These theories for how to use so called electrodynamic repulsion in magnetic bearings have been known since long time. The great disadvantage with such bearings has been that the bearing generates very much heat, i.e. given rise to unacceptably high energy losses.

It was not until the discovery of "the null flux scheme" that the losses could be reduced and this suspension method was taken seriously. The theory behind "the null flux scheme" is carefully described in e.g. "Magnetic suspension . . . ", Journal of Applied Physics, Vol. 43, No 6, June 1972 by P. L. Richards and M. Tinkham, and is founded on that unnecessary heat generation due to resistive losses can be compensated away by means of two oppositely directed magnets, used to form an area with a weak magnetic field, in which the electrically conductive material is brought to be floated.

Eddy current bearings according to the state of the art are all founded on "the null flux scheme" and are present in a number of designs. Most of them are in the form of linear bearings intended to be used for high speed trains, as for instance in the patent documents U.S. Pat. Nos. 3,951,075 and 3,903,809 in the names of Miericke et al, and the Swedish patent SE 500 120 in the name of Lembke. Lembke also suggests to use the bearing for rotating shafts, which also is mentioned in the patents U.S. Pat. No. 3,779,618 in the names of Soglia et al and U.S. Pat. No. 3,811,740 in the names of Sacerdoti et al.

These bearings according to the state of the art all use one additional method for reducing the losses, viz. to let all static loads, such as inherent weight etc., be carried by a separate magnetic relieving device in the form of e.g. an attracting permanent magnet. Then, no additional eddy currents are needed to give rise to this force, the rotor may centre in the middle between the magnets, where the losses are minimal.

Despite that the losses has been reduced considerably by both "the null flux scheme" and said relieving device, a disadvantage for magnetic bearings according to the state of the art is that the losses still are too high to enable a commercial application of the bearings. Even if the bearings suggested by Lembke by experimental trials have been proved to be proportionally good, especially considering axial bearing, radial bearings of this type nevertheless still result in problems. For one thing because the thermoexpansion of the rotor has appeared to influence the losses considerably, since the rotor no longer is able to centre exactly between the magnets.

According to Richards, "the null flux scheme" offers the possibility to achieve infinitely small losses, presumed that the electrically conductive material, in his case the rail, is infinitely thin and that the magnets are infinitely strong. Furthermore, the speed has to be infinitely high. The practical limitations are obvious, and despite that the best magnets presently available have been used together with very thin plates, no really satisfactory results have been achieved.

The basic reason for the disadvantages with magnetic bearings according to the state of the art is that the area where the field has "null flux", i.e. lacks any normal component, is infinitely thin by it self, why only an infinitely thin plate can be used. If the plate exhibits a thickness, the surface layers will be exposed to a fluctuating magnetic field when the plate passes by the magnets, whereby unnecessary eddy currents arise.

SUMMARY OF THE INVENTION

The object of the present invention is to provide a device for suspension of units in relative rotation, which totally eliminates unnecessary losses caused by induced eddy currents.

Another object of the present invention is that the device should be insensitive for thermoexpansion.

The above objects are achieved by a device exhibiting the features described in the claims. The device operates according to the electrodynamic repulsion principle, where a rotor formed of a electrically conductive material rotates relative to a stator, comprising magnets, which give rise to a rotationally symmetric magnetic field concentric with the rotation axis of the rotor. A magnetic field constituted in this way has the property that for an arbitrary, at the rotor existent, passing volume segment do not appear to have any alternating field component.

Thus, since the normal component of such a field do not generate any eddy currents, this does not have to be zero, as opposed to what is valid for "the null flux scheme". Accordingly, the electrically conductive material does not have to be infinitely thin, and furthermore it does not need to be positioned exactly in respect of the magnets. Thus, the bearing is not sensitive for thermoexpansion.

DESCRIPTION OF THE DRAWINGS

The invention is further explained by description of exemplifying embodiments with guidance by drawings, in which:

FIGS. 3a and 3b show possible magnetisation directions for annular magnets;

FIG. 4 shows a schematic sketch of the annular magnets in a preferred embodiment according to the present invention, where sets of axially stacked, axially magnetic oriented annular magnets are used;

FIG. 5 shows a schematic sketch of a part of yet another embodiment according to the present invention, where a shaft is suspended at both ends thereof;

FIG. 6 shows a sectional view of the bearing in the embodiment shown in FIG. 2, where an eccentricity is present in the movable part;

FIG. 7 shows a sectional view of the bearing in the embodiment shown in FIG. 2, without eccentricity;

ILLUSTRATIVE EMBODIMENTS

Following, a number of embodiments of the present invention will be described. However, it will be understood by someone skilled in the art that these embodiments are only exemplifying and should not be interpreted as any limitation of the scope of the present claims.

Figure 1:
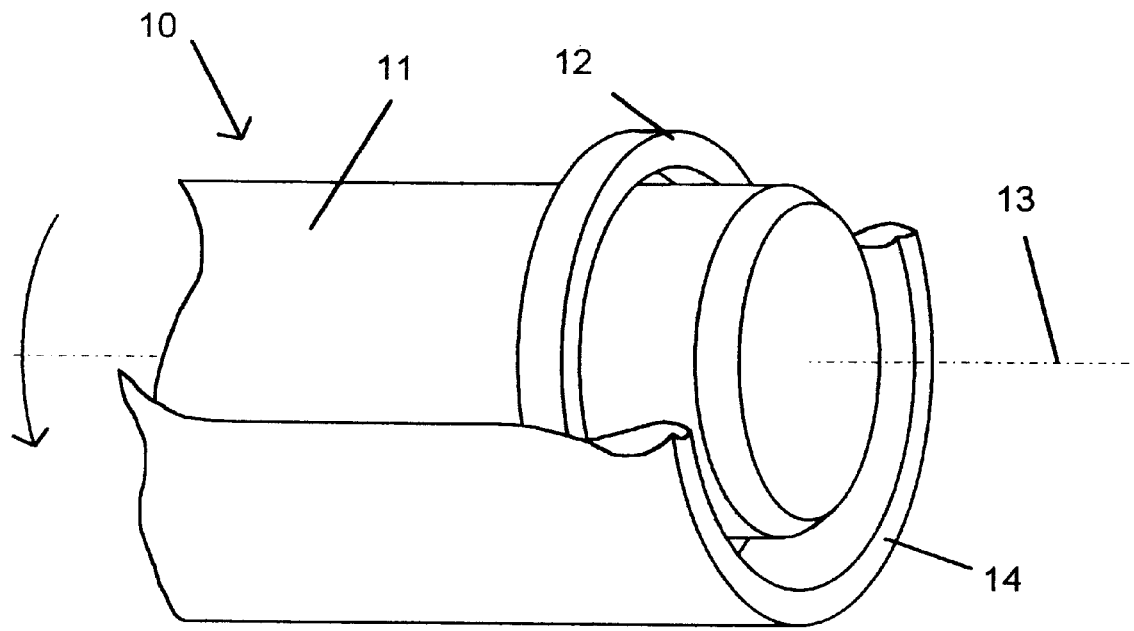
FIG. 1 shows a schematic sketch of a part of an embodiment according to the present invention, where a single magnet is used.

In FIG. 1, an embodiment of the present invention is shown, where some parts are excluded so as to expose the essential parts of the embodiment. A rotor 10 comprising an electrically conductive unmagnetic rotational body 11 is rotatable within an annular magnet 12. The rotational body 11 does not need to be rotationally symmetric as such, but is preferably carefully balanced with respect to a rotation around a fictitious rotational axis 13. The annular magnet 12 is designed to give rise to a rotationally homogeneous magnetic field. By rotationally homogeneous should be understood such a field which in the present rotationally symmetric embodiment does not appear to have any alternating field component for an arbitrary, at the rotational body 11 existent, passing volume segment, when the symmetry axis of the magnetic field coincides with the rotational axis 13 of the rotational body. The annular magnet 12 may be comprised by permanent magnets, magnets of an electromagnetic character, such as superconductors, or a combination thereof. The annular magnet is provided at a stator 14, which in FIG. 1 partially is cut away. The rotor 10 may in its not shown end be suspended by an arbitrary bearing.

By the above described embodiment, eddy currents will not appear in the rotational body as long as this rotates concentrically with respect of the magnets, since the normal component of such a field does not generate any eddy currents. This is valid even if the rotational body has an extension in radial direction, i.e. has a certain thickness, or if it is exposed to thermoexpansion and thus does not run in the middle of the air gap. In contrary, stabilising currents appears as soon as the rotor is displaced from the centre position and starts to rotate eccentically.

If the bearing is exposed for a disturbance so that it starts to rotate excentrically, the above mentioned volume segment experiences an alternating magnetic field and in the rotational body 11 centering eddy currents appears, which bring the rotor back to its original position. This is possible since the field has a gradient, i.e. is decreasing, in radial direction, as viewed from the centre of the magnet.

Figure 2:
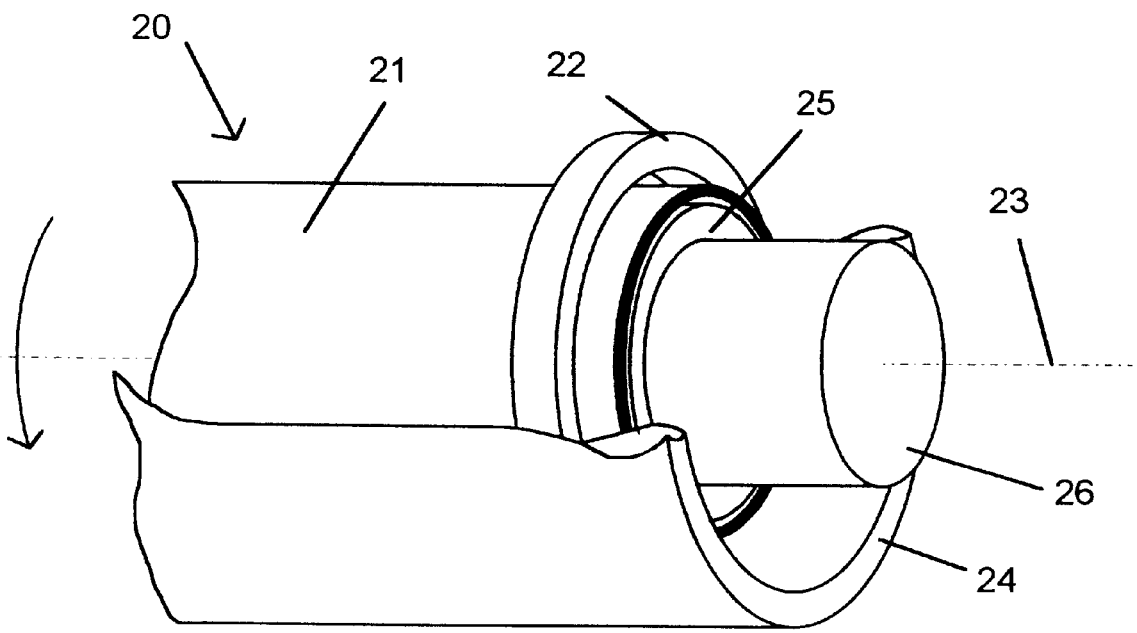
FIG. 2 shows a schematic sketch of a part of another embodiment of the present invention, where two magnets are used.

In FIG. 2, another embodiment of the present invention is shown. This embodiment comprises, in a similar manner to the previous embodiment, a rotor 20, which comprises an electrically conductive unmagnetic rotational body 21, which is rotatable within a first annular magnet 22 and which has a fictitious rotational axis 23. The rotor is in this embodiment tubular and encloses radially a stationary axis 26. A second annular magnet 25 is provided at the stationary axis 26, which in turn constitutes a part of a stator 24. The annular magnets 22, 25 are designed in the same manner as was described above. The rotor 20 may in its not shown end be suspended by an arbitrary bearing.

An annular magnet can have its magnetic dipole directed in two principally different directions. These two pure cases are sketched in FIGS. 3a and 3b, where arrows indicate the direction of the magnetic dipole. In the magnet in FIG. 3a, the magnetic dipole is directed parallel to the rotation symmetry axis of the annular magnet, which magnet is described as magnetically axial oriented, while the magnet in FIG. 3b has the magnetic dipole directed perpendicular to the rotation symmetry axis of the annular magnet, whereby it is described as magnetically radial oriented.

By placing two magnetically axial oriented annular magnets 22, 25 concentrically in the same plane, as in FIG. 2, with the dipoles directed in the same directions, it is possible to enhance the magnetic gradient formed in the slit between the annular magnets 22, 25. In a corresponding way, two magnetically radial oriented annular magnets 22, 25 may be placed concentrically in the same plane, with the dipoles directed in opposite direction, and thereby give rise to an enhanced magnetic gradient. Since the rotor 20 rotates in the slit between the magnets, the gradient of the, by the rotational body 21 experienced, radial magnetic field component is enhanced, (while the tangential remains zero) under presumption that the rotational axis 23 of the rotor coincides with the symmetry axis of the magnets. By any disturbance, i.e. displacement of the rotational axis 23 of the rotational body, the restoring force generated by the induced eddy currents will be stronger than in the case of one single annular magnet. Thereby, a more rigid resilience is achieved.

Another way to enhance the restoring force is to create a large radial magnetic field component along a wider section along the rotational body. This may be done by, instead of positioning additional annular magnets radially with respect to the first one, placing them axially with respect to the first one. To maximise the magnitude of radial gradient, the annular magnets should be placed with alternating directed polarities. This is valid both for magnetically axial oriented and magnetically radial oriented annular magnets.

Obviously, a preferred embodiment comprises a combination of the two above described ways to enhance the magnetic action. The configuration of the magnets in such an embodiment, with magnetically axial oriented magnets, is shown in FIG. 4. By having two concentric provided sets of alternating directed annular magnets, which give rise to an intermediate slit, in which the rotor is able to rotate, the magnetic effect can be multiplied.

FIG. 5 shows a special embodiment of the present invention. A totally tubular shaft 31 constitutes in this case a rotational body and has magnetic bearings with annular magnets 32, 35 provided at each end. The shaft 31 is electrically conductive and serves simultaneously as shaft and bearing. The annular magnets 32, 35 are attached to a stator 34 and a thereto attached axle 36. By that, the device is possible to be made very light, and at the same time rigid, which results in that it can be used at very high rotational speed.

In FIGS. 6 and 7, it is shown how the restoring forces act in a device according to the present invention. The FIGS. 6 and 7 show a bearing which corresponds to the embodiment shown in FIG. 2, where the stator and the stationary shaft has been omitted, but the principles are the same also for other possible embodiments. In FIGS. 6 and 7, most notations are the same as in FIG. 2. In FIG. 7, the rotational axis of the rotational body 21 is displaced with respect of the symmetry axis of the magnetic field which is generated by the annular magnets 22, 25. A volume segment 28 of the rotational body 21 will during its rotation experience an alternating magnetic field along its direction of motion, whereby an eddy current arises in the volume segment 28. This eddy current will give rise to a force which counteracts the movement. The total resultant force acting at all volume segments in the rotational body will be directed upwards in the figure and is represented by F.

In FIG. 7, the rotational body 21 lies concentrically to the magnetic field and no eddy currents arise in the rotational body 21, and thereby, the total resultant force on the rotational body 21 is zero.

Figure 8G:
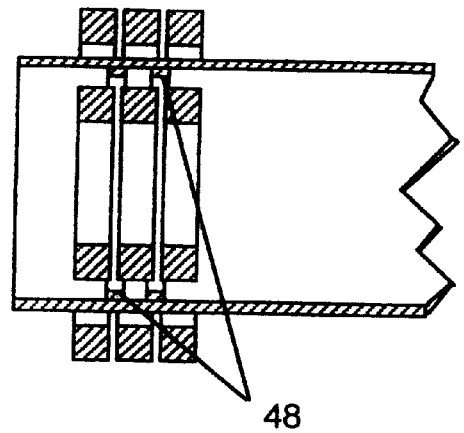
FIGS. 8a to 8f shows, in section, a number of embodiments of magnetic bearings according to the present invention.

Different applications to magnetic bearings according to the present invention results in different preferred embodiments. In FIGS. 8a to 8g, some interesting embodiments are illustrated in sectional views. FIG. 8a shows corresponding embodiment as in FIG. 2, with two concentric annular magnets, one inside and one outside a rotating cylindrical axis. FIG. 8b shows an application where a rotor with conical sections at the suspension positions is used. Such an embodiment also gives at a non-vertical positioning a small axially suspending action. FIG. 8c shows an embodiment which has similarities with the one shown in FIG. 4, but with three pairs of annular magnets. The embodiment in FIG. 8d also presents three pairs of annular magnets, but between these, in this embodiment, annular shaped plates of soft iron 49 are provided. This set-up concentrates the magnetic flux to the area between concentric iron plates, whereby the magnetic force at these positions are enhanced. FIG. 8e shows an embodiment, where three axially stacked annular magnets with interpositioned iron plates act as bearing. However, in this embodiment the rotor comprises two concentric tubular sections, which are movable outside and inside the annular magnets, respectively. The magnetic field is thereby used to influence the axis both external and internal of the magnets. FIG. 8f shows an extension of this reasoning, whereby two concentric sets of annular magnets are used together with a rotor comprising three concentric tubular sections. FIG. 8g shows an embodiment which at the expense of a part of the efficiency of the radial suspension achieves a slight axially acting suspension. In this embodiment, a rotor is encircled by three outer and three inner annular magnets, as in FIG. 8c. However, the rotor comprises in this embodiment also two iron rings 48, which are placed along the rotational axis flush with the space between the three annular magnet pairs. These iron rings 48 will reduce the radial suspension, as compared with the embodiment in FIG. 8c, but at an axial displacement of the rotor, the change in the magnetic flux will tend to restore the rotor to the original position. The iron rings 48 may either be placed inside the rotor, or outside the same.

The above defined annular magnets may of course be replaced by magnets with other rotation symmetric geometries.

The magnets may be provided by different magnet types, or combinations thereof. A permanent magnet is a simple solution at high speeds, where the high speeds give rise to strong restoring forces. The permanent magnets operates poorer at low speeds or when standing still. By the same reason are electromagnets fed by direct current superb at high rotational speed, while at low rotational speed high currents are needed to give rise to sufficient strong restoring forces. Superconducting magnets may preferably be used. A solution at low rotational speed is to use electromagnets fed with alternating current, which even may cope with a floating contact free suspension for a stationary rotor. However, electromagnets fed by alternating current are less stable at high rotational speed. A preferred embodiment comprises the combination of a permanent magnet and an electromagnet fed by alternating current, whereby a stable suspension for all rotational speeds easily is obtainable.

The electromagnets have the advantage that it is possible to vary its strength during operation and accordingly adapt the properties of the magnet bearing. The rigidness of the bearing, i.e. with how large force a displacement from the ideal path is prevented, is easily set, e.g. depending on the speed by which the rotor rotates. When using a combination of static and fluctuating magnet fields, the mutual relative strength between these two types may preferably be changed. By acceleration of a rotor from stationary conditions to a high rotational speed, it is preferable if the alternating field initially dominates, at the low rotational speeds, whereupon the static field takes over as the rotor accelerates. This can be realised by controlling the currents and/or frequencies for the currents which are sent through the electromagnets.

Since the suspension features are not fully developed at low rotational speed, they can either be enhanced by making the wall of tubular shaft thicker or supplemented with some kind of start-up bearing.

The simplest form of start-up bearing would be to cover magnets and may be the shaft with a thin material exhibiting good sliding properties, e.g. Teflon. At start-up, the shaft slides at the sliding surface until the speed is enough high that the shaft lifts and stabilises by the magnet field.

Instead of sliding bearings, ball bearings may of course be used, which then is given a diameter which is slightly larger than the present shaft. The method is common as so called emergency bearings for active magnet bearings.

Air bearings is a better method. In this method, during the start-up phase, air is pumped through small holes drilled between the magnets along the length of the shaft, where a suspending air cushion is created.

The best start-up method is to use an alternative magnet bearing of simplest kind. This bearing does only need to operate axially, but may be designed so as to give a passive radial stability. The bearing does not need to operate at high rotational speed, why the electronics can be manufactured considerably cheaper than for conventional active magnet bearings.

Figure 9:
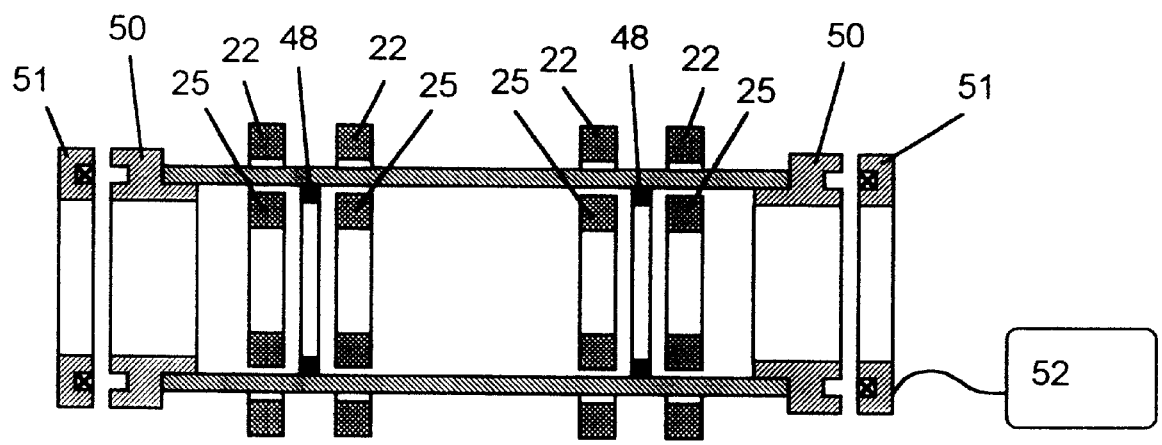
FIG. 9 shows a sectional view of a possible start-up bearing.

One example of such a combined bearing is shown in FIG. 9. A rotating shaft is provided in both ends by iron fittings 50. These are set just opposite to electromagnets 51 fitted to the stator, which electromagnets are controlled by a simple control electronics 52. Other reference numbers represent earlier described details. The magnets give a radial stability at high speed and the iron ring gives axial stability at all rotational speed, but also a radial instability, as earlier described. The electromagnet stabilises the bearing radially and enhance the axial stability. At high rotational speed, the electromagnet and its control system may be disconnected.

If the electromagnet is not disconnected at high rotational speed, it may be used for measuring and/or compensation of mechanical forces at the rotor.

In the above described embodiments, a few embodiments according to the present invention have been described. It is understood that the characterising features of the present invention can be combined in many different configurations and combinations, which all are covered by the scope of the claims.

What is claimed is:

1. A magnetic bearing, operating in accordance with the electric-dynamic repulsion principle, for the magnetic suspension of a rotor (20, 30) in rotational movement relative to an outer first stator (24,34) and an inner second stator (26,36), respectively, about a central axis (23,33) of said first and second stators, comprising:

a rotor having a tubular rotational body (21, 31) made from an electrically conductive and non-magnetic material;

an annular, rotation symmetric first magnet (22,32) arranged on the outer first stator (24, 34);

an annular, rotation symmetric second magnet (25, 35) arranged on the inner second stator (26, 36), the first and second magnets being arranged in a common plane, concentrically about said central axis, forming a slit between the first and second magnets where the tubular rotational body is allowed to rotate;

the dipoles of the first magnet being equally directed about the whole periphery of the first magnet, and the dipoles of the second magnet being equally directed about the whole periphery of the second magnet, and a rotation symmetric magnet field being provided concentrically about the central axis, so that eddy currents are induced in the rotational body of said electrically conductive and non-magnetic material only when said rotational body (21, 31) tends to rotate eccentrically about said central axis of the first and second stators.

2. The magnetic bearing of claim 1, wherein the first and second magnets are magnetically axially oriented in the same direction of polarity.

3. The magnetic bearing of claim 1, wherein the first and second magnets are magnetically radially oriented in opposite directions of polarity.

4. The magnetic bearing of claim 1, wherein at least two sets of first and second magnets are axially spaced relative to the tubular rotational body, the sets of magnets having alternately directed polarities.

5. The magnetic bearing of claim 1, wherein at least one of said rotation symmetric magnets (25, 35) is an electromagnet fed by direct current.

6. The magnetic bearing of claim 1, wherein at least one of said rotation symmetric magnets (25, 35) is an electromagnet fed by alternating current.

7. The magnetic bearing of claim 1, wherein at least one of said rotation symmetric magnets (25, 35) is a permanent magnet.

8. The magnetic bearing of claim 1, wherein at least one of said rotation symmetric magnets (25, 35) is a superconducting electromagnet.

9. The magnetic bearing of claim 1, wherein at least one of said rotation symmetric magnets (25, 35) is an electromagnet fed by alternating current, and the magnitude of the current and the frequency of the alternating current through the electromagnet is controllable during operation.

* * * * *